United States Patent
Wentworth et al.

(10) Patent No.: US 6,792,820 B2
(45) Date of Patent: Sep. 21, 2004

(54) METHOD AND ACCESSORIES FOR PIPE REPLACEMENT

(75) Inventors: Steven W. Wentworth, Brookfield, WI (US); Payce D. Reynolds, Oconomowoc, WI (US)

(73) Assignee: Earth Tool Company, L.L.C., Oconomowoc, WI (US)

( * ) Notice: Subject to any disclaimer, the term of this patent is extended or adjusted under 35 U.S.C. 154(b) by 0 days.

(21) Appl. No.: 10/113,815

(22) Filed: Mar. 29, 2002

(65) Prior Publication Data

US 2002/0162406 A1 Nov. 7, 2002

Related U.S. Application Data

(60) Provisional application No. 60/279,837, filed on Mar. 29, 2001.

(51) Int. Cl.$^7$ .......................... G01M 19/00; B08B 9/02; F16L 55/18; F16L 55/26
(52) U.S. Cl. ...................... 73/865.8; 405/156; 405/184; 15/104.03; 15/104.05
(58) Field of Search ...................... 73/865.8; 15/104.03, 15/104.05, 104.061, 104.062, 104.063, 104.08, 104.09, 104.13, 104.14, 104.15, 104.16, 104.31, 104.33; 405/156, 184, 184.1, 184.2, 184.3, 184.34, 184.35

(56) References Cited

U.S. PATENT DOCUMENTS

| | | | | |
|---|---|---|---|---|
| 4,000,655 A | * | 1/1977 | Jones ........................ 73/865.8 |
| 4,516,286 A | * | 5/1985 | Crane ....................... 15/104.12 |
| 4,855,838 A | * | 8/1989 | Jones et al. .................... 34/84 |
| 5,473,246 A | * | 12/1995 | Philpot ........................ 324/220 |
| 5,564,863 A | * | 10/1996 | Reber ....................... 405/184.1 |
| 5,580,188 A | * | 12/1996 | Nowak ....................... 405/184 |
| 5,713,093 A | * | 2/1998 | Enz .......................... 15/104.12 |
| 5,782,311 A | | 7/1998 | Wentworth .................. 175/53 |
| 5,913,977 A | * | 6/1999 | Nichols ....................... 118/712 |
| 6,065,174 A | * | 5/2000 | Laymon ................ 15/104.061 |
| 2002/0113869 A1 | * | 8/2002 | Kirkwood ..................... 348/84 |

\* cited by examiner

Primary Examiner—Hezron Williams
Assistant Examiner—David A. Rogers
(74) Attorney, Agent, or Firm—Philip G. Meyers

(57) ABSTRACT

A method of replacing an existing underground pipe, especially a sanitary sewer line, uses a boring machine that advances a drill string of hollow rods through the existing pipe. The method includes the steps of mounting a rotary cleaning tool on a distal end of the drill string, moving the cleaning tool progressively through the underground pipe while rotating the drill string in order to clean the inside of the pipe, flushing debris loosened by the cleaning tool from the pipe using a pressure fluid, removing the cleaning tool from the drill string and mounting a camera assembly on the distal end of the drill string, moving the camera and drill string through the underground pipe on the drill string and inspecting the inside surface of the pipe with the camera, removing the camera from the drill string and replacing it with a pipe destroying apparatus, moving the pipe destroying apparatus through the pipe to destroy the existing pipe, and then installing a replacement pipe along the same line as the destroyed existing pipe. This permits a single piece of equipment, such as a directional drill rig, to perform several different functions as part of the pipe replacement process.

19 Claims, 4 Drawing Sheets

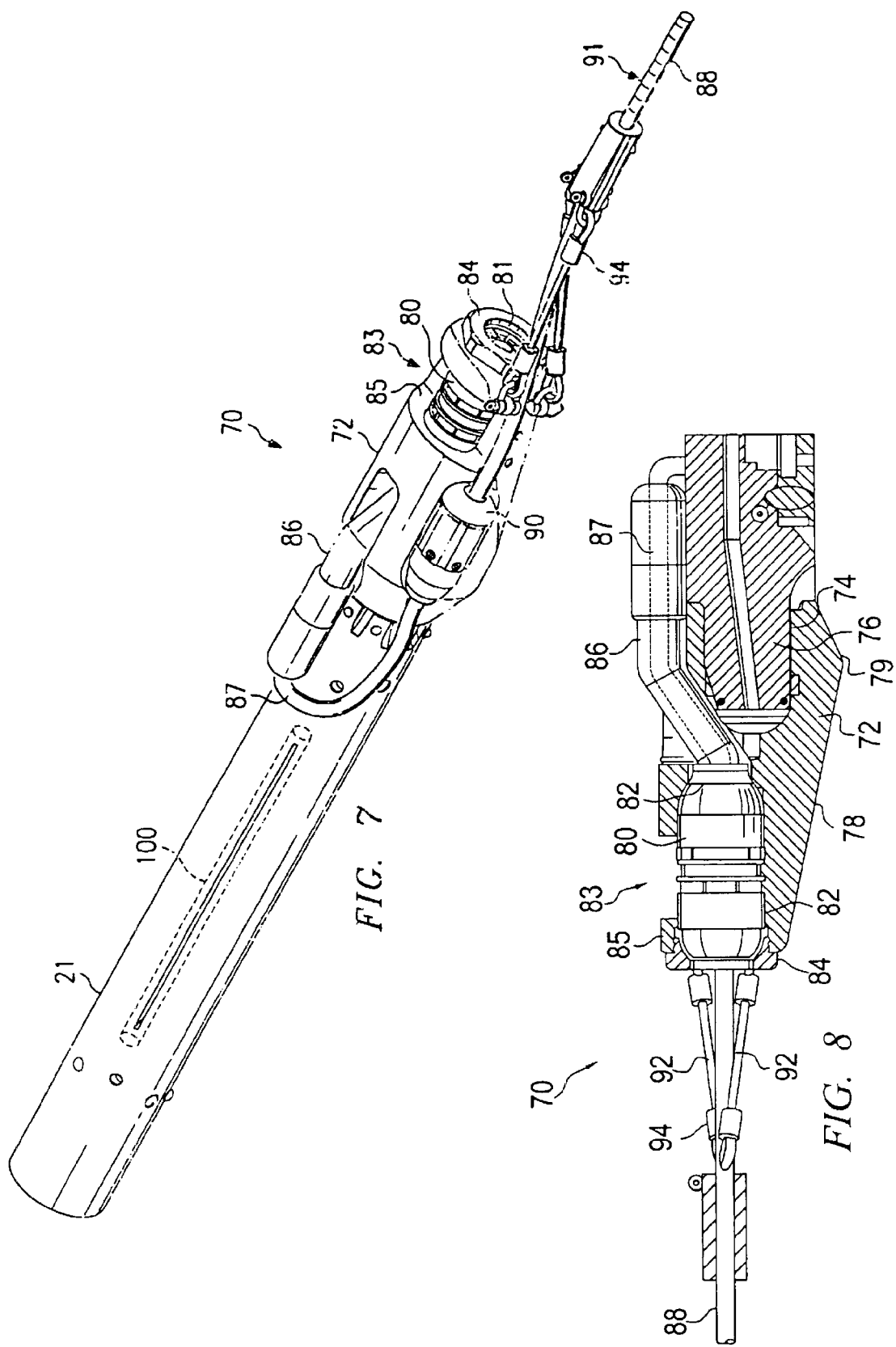

METHOD AND ACCESSORIES FOR PIPE REPLACEMENT

RELATED APPLICATIONS

This application is a conversion of U.S. Provisional Application Serial No. 60/279,837, filed Mar. 29, 2001, the disclosure of which is incorporated herein for all purposes.

TECHNICAL FIELD

The invention relates to a method and apparatus for cleaning and inspecting underground pipes and conduits in order to facilitate repair and replacement of such under ground pipes.

BACKGROUND OF THE INVENTION

A known technique for replacing sanitary sewer lines and various other underground conduits and pipes is to burst or expand the existing pipe and then pull a replacement pipe through the expanded bore. In one variation of this process, a horizontal directional drill advances a drill string with pipe bursting or splitting tool affixed to the end of the drill string. The system may include a impact device mounted at the end of the drill string such as a rotary impactor (see U.S. Pat. No. 5,782,311) or a pneumatic impact tool that delivers cyclic impacts to the bursting or splitting tool. The replacement pipe is attached to the bursting or splitting tool and pulled through the bore behind it.

It is common practice to clean an existing sanitary sewer pipe prior to a line replacement operation. Lateral connections, for example to residences, must be accurately located and marked to avoid excessive excavation. However, in many cases, existing underground pipelines will have an accumulated buildup of solids, grease, and wax-like materials that may interfere with the inspection, bursting, splitting and/or replacement operations. The accumulated buildup may also prevent or interfere with locating pipe joints, which in the case of cast iron pipes may require particular attention during the splitting operation.

In the past, sanitary sewers have been cleaned with specialized equipment including high pressure water jets operating at 2000 psi. This method of cleaning requires the use of a jet truck, i.e., a truck specially equipped with one or more specialized pumps designed to deliver moderate volumes of water at extremely high pressures, a high pressure hose to reach the area or areas to be cleaned, and nozzles specially designed to direct the high pressure water into a jet capable of cutting the materials. The nozzles are radially spaced and angled rearwardly so that the discharge of water through the nozzles creates a reaction force to propel the high pressure hose through the pipe being cleaned. A "soup" of suspended solids, grease and water flows downstream through the pipeline. In some cases the jet truck will vacuum this soup from a manhole, the same manhole the spray head was introduced from.

This invention makes opportunistic use of the presence of a horizontal drilling machine using a rigid drill string during a pipe bursting and replacement operation. Conventionally, horizontal directional boring machines are used only for the pipe bursting and replacement stage of the operation. The present invention provides accessories by which other useful steps can be carried out using the directional boring machine, including cleaning and inspecting existing pipes.

SUMMARY OF THE INVENTION

The invention provides a method of replacing an existing underground pipe, especially a sanitary sewer line, using a boring machine that advances a drill string of hollow rods through the existing pipe. Such a method includes the steps of:

(a) mounting a rotary cleaning tool on a distal end of the drill string;
(b) moving the cleaning tool progressively through the underground pipe while rotating the drill string in order to clean the inside of the pipe;
(c) flushing debris loosened by the cleaning tool from the pipe using a pressure fluid;
(d) removing the cleaning tool from the drill string and mounting a camera assembly on the distal end of the drill string;
(e) moving the camera and drill string through the underground pipe on the drill string and inspecting the inside surface of the pipe with the camera;
(f) removing the camera from the drill string and replacing it with a pipe destroying apparatus;
(g) moving the pipe destroying apparatus through the pipe to destroy the existing pipe; and
(h) installing a replacement pipe along the same line as the destroyed existing pipe. The existing pipe can be destroyed by any known method appropriate to the material the pipe is made from, such as pipe bursting or pipe slitting and spreading. According to preferred forms of the invention, the pressure fluid is supplied through the drill string and ejected from the cleaning tool as the cleaning tool advances through the existing pipe.

The existing pipe is typically a sanitary sewer line having a number of lateral line connections. As such, step (e) preferably involves determining the locations of the lateral line connections to the existing pipe, such as by connecting a sonde to the camera and marking the position of the lateral above ground by detecting the sonde's position when the camera shows a lateral connection. For this purpose, the camera is typically a video camera that provides a live feed of the pipe interior and has a built in light source.

According to a preferred form of the invention, steps (a) to (c) are performed as the drill string is extended from an entrance to an exit at opposite ends of the existing pipe. The entrance and exit may be openings in a pit or manhole. Step (d) is then performed while the distal end of the drill string is near the exit, and step (e) is performed as the drill string is retracted from the exit back to the entrance. In this manner the existing pipe is cleaned, flushed and then inspected in one down and back cycle of the drilling machine. The same drilling machine is then used for the subsequent steps of destroying the existing pipe, replacing it with a new pipe, and optionally de-beading the new pipe after lateral connections have been welded on.

The pipe inspection and cleaning aspects of the invention can also be used separately when the occasion requires and specialized equipment is not available. A method for inspecting an inside surface of a pipe using a horizontal boring machine that advances a drill string of hollow rods through the pipe includes the steps of attaching a camera to a distal end of the drill string, moving the camera through the underground pipe on the drill string, and imaging the inside surface of the pipe with the camera while the camera is inside the pipe. A method of cleaning an underground pipe includes the steps of mounting a rotary cleaning tool on a distal end of the drill string, moving the cleaning tool progressively through the underground pipe while rotating the drill string in order to clean the inside of the pipe, and flushing debris loosened by the cleaning tool from the pipe using a pressure fluid.

The invention further provides a pipe cleaning tool useful in such a method adapted to be mounted on the end of a drill string and advanced through an underground pipe with a horizontal drilling machine to clean the pipe. Such a tool includes a generally cylindrical body including a front nose section, a plurality of side flats at intervals around the circumference of the body, and a rear connecting portion configured for connecting the pipe cleaning tool to the drill string. A flexible flap mounted on each of the flats extends tangentially from the body and is configured to scrape along the inside of the pipe as the cleaning tool is advanced through the pipe. The body further includes fluid passages for communicating through the drill string with a source of a pressure fluid, and a plurality of nozzles connected to the fluid passages for ejecting the pressurized fluid in a radial direction as the tool is advanced through the pipe.

The invention also provides an apparatus for inspecting a pipe. Such a device includes an electronic camera and an elongated carrier body having a recess adapted to receive the camera therein, an end connecting portion configured for mounting the carrier body on a drill string, and an opening whereby the camera can be positioned to capture an image through the opening. The camera is preferably a video camera and transmits its signal through a cable to a video display above, permitting the operator to inspect the condition of the line interior and locate lateral branch lines. These and other aspects of the invention are described in the detailed description that follows.

BRIEF DESCRIPTION OF THE DRAWINGS

FIG. 7 is a perspective view of a camera assembly according to one aspect of the invention, the camera assembly being mounted on a sonde housing; and FIG. 8 is a partial lengthwise section of the camera assembly of FIG. 7.

DETAILED DESCRIPTION

Figure 1:
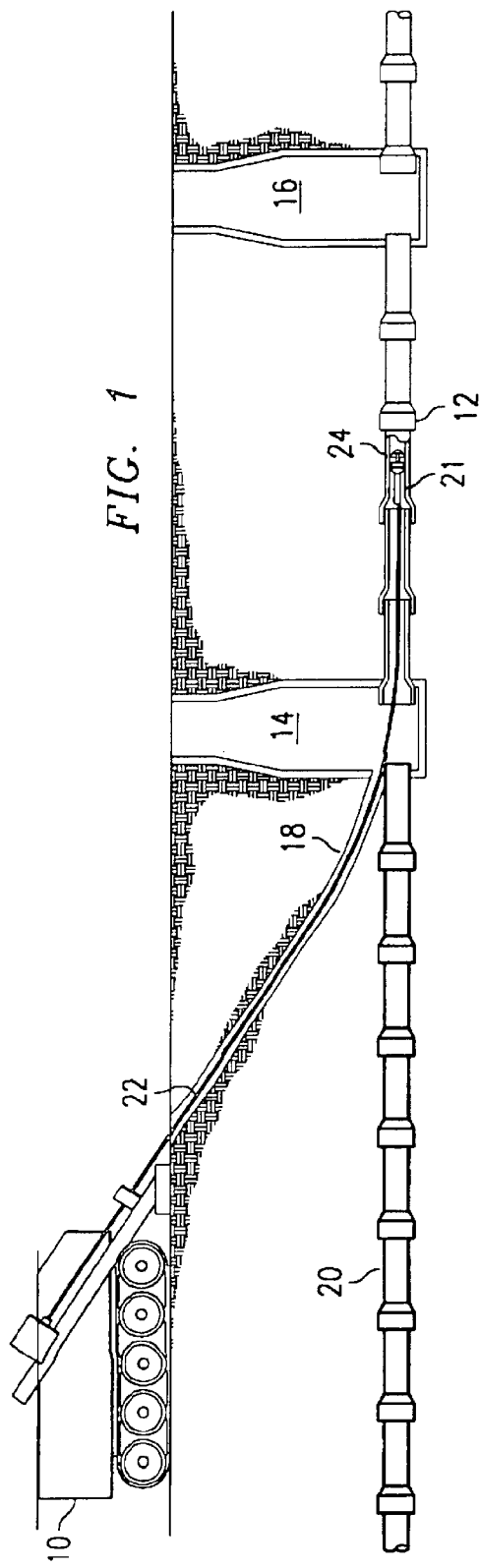
FIG. 1 is an illustration of a pipe cleaning operation wherein a pipe section between two manholes is being cleaned in a method according to the invention.
Figure 2:
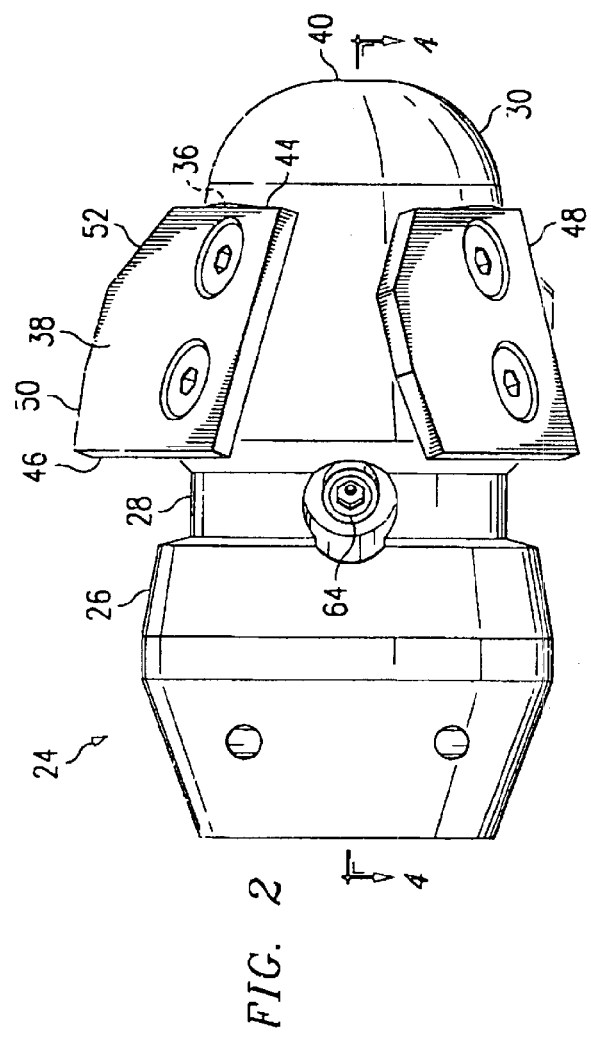
FIG. 2 is a first side view of a cleaning tool according to the invention.
Figure 3:
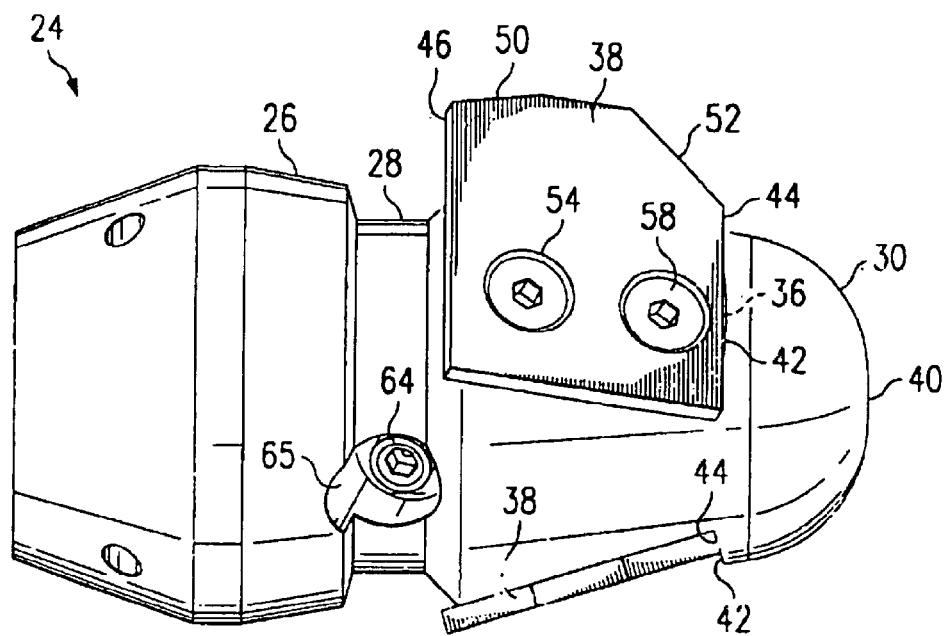
FIG. 3 is a second side view of the cleaning tool of FIG. 2.

FIG. 1 illustrates a pipe inspection operation wherein a pipe section 12 extending between first and second manholes 14 and 16 is to be cleaned and inspected. In the operation, an operator, using a conventional directional boring machine 10, drills an entry bore 18 from the surface on an arcuate path, intersecting existing pipe 20 with a drill string 22 in a tangent manner, preferably at an existing exposed location such as at a first manhole 14. Alternately, instead of boring in an arcuate path, directional boring machine 10 may be placed in an access pit excavated adjacent to the start of a pipe section 12 to be replaced. The particular tool to be used in the operation is installed on the drill string 22 in manhole 14 and the drill string is positioned inside of the existing pipe section 12 that is due for replacement.

In accordance with a method of the invention, a cleaning tool 24 is installed on the free end of the drill string 22 in manhole 14. Using the high pressure fluid pump mounted on the horizontal direction drilling machine (hereafter HDD), pressurized cleaning fluid is supplied to the tool through drill string 22 to tool 24 which delivers a spray to the interior of the pipe section 12 to clean and wash the accumulated grease and solids from the pipe. The spray may, for example, be water plus a grease-cutting surfactant or detergent. In the embodiment illustrated in FIG. 1, tool 24 is attached to the front end of a sonde housing 21, which in turn is mounted on drill string 22.

Figure 4:
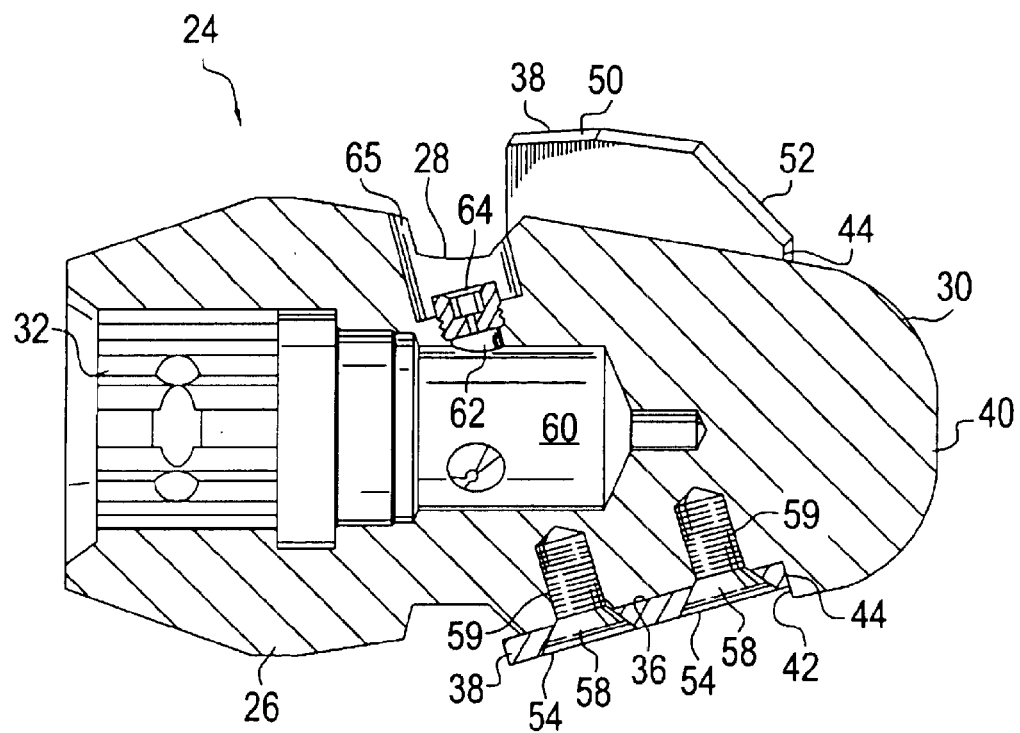
FIG. 4 is sectional view taken along line A—A of FIG. 3.
Figure 5:
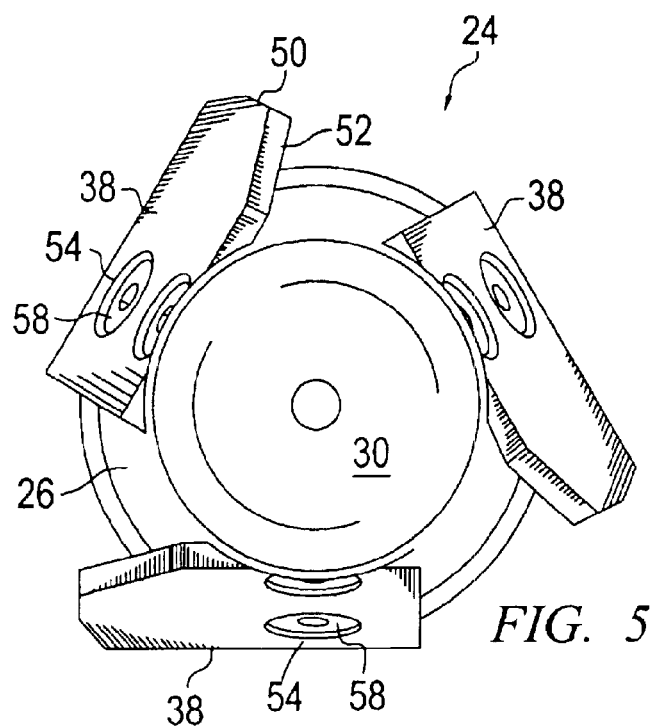
FIGS. 5 and 6 are front and rear views, respectively, of the cleaning tool of FIG. 2.
Figure 6:
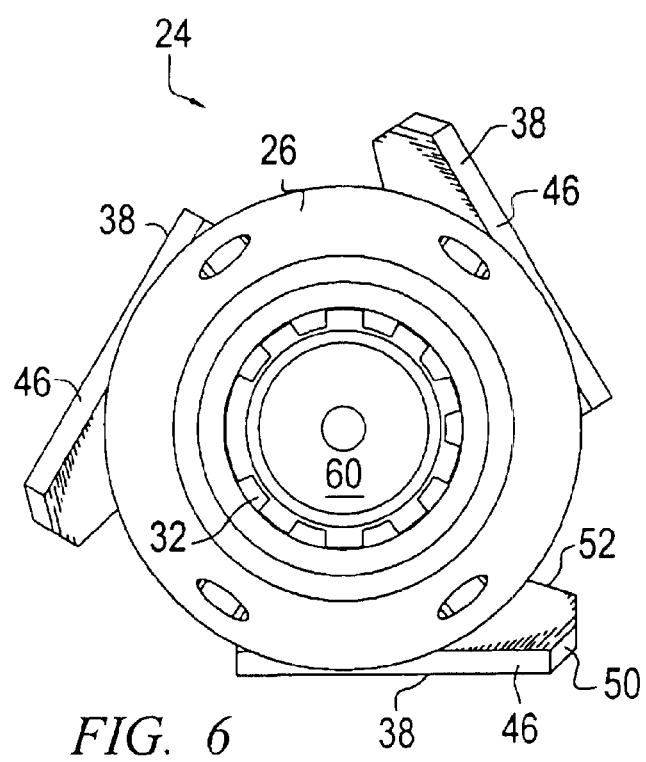

Turning to FIGS. 2 through 6, cleaning tool 24 includes a generally cylindrical shaped body 26 including an annular groove 28 positioned midway along its length. Body 26 includes a forwardly rounded (semi-spherical or bullet shaped) nose section 30 ahead of groove 28 to aid in inserting and guiding tool into and through pipe section 20. As best shown in FIGS. 4 and 6, a splined recess or socket 32 extends into body 26 at the rear of tool 24 and is configured to receive the male end of a splined connection or joint such as described in Wentworth U.S. Pat. No. 6,148,935, the contents of which are incorporated by reference herein. Alternatively, tool 24 may be connected to drill string 22 with any number of conventional joints known in the art including, for example, a standard API threaded joint.

Nose 30 has a plurality of radially spaced flats or mounting surfaces 36. Flats 36 are located ahead of groove 28 but rearwardly spaced from tip 40 of nose 30. A flexible cleaning paddle or flap 38 is mounted on each of flats 36 such that a forward end 44 of each flap 38 abuts a forward endwall 42 of each flat 36. Each of flaps 38 includes a forward end 44, a rear end 46 a leading side 48 and trailing side 50 and an angled side portion 52 between forward end 44 and a trailing side 50. As shown, each of flaps 38 is configured to extend tangentially outward from nose section 30 so that trailing side 50 scrapes the interior of pipe 20 as tool 24 is rotated, cleaning grease and solids from the interior surface of pipe 20. Side section 52 is angled at approximately 45° relative to forward end 44, and rear end 46 extends past the associated flat 36, overlying a minor portion of groove 28. The use of angled side 52, as opposed to joining forward end 44 and trailing side 50 at a right angle, allows flaps 38 to gradually engage grease and solids built up on the interior of pipe 20 as tool 24 is advanced, and tends to reduce the forces applied to the flap and prevent breakage. To further prevent breakage, flaps 38 are preferably formed from a hard, flexible plastic material exhibiting a high level of abrasion resistance.

As shown, three flaps 38 are mounted on flats 36 with flaps 38 spaced equiangularly (at 0°, 120° and 240°) from each other around the circumference of nose section 30. It will be appreciated that a greater or lesser number of flats 36 and flaps 38, spaced at different and/or non-uniform intervals may be employed. For example, a tool 24 designed for small diameter pipes may only include two flaps 38, spaced 180° apart.

Each of flaps 38 includes one or more (two shown) countersunk apertures 54 that align with threaded bolt holes 59 for receiving a threaded fastener such as a cap screw 58 that is screwed into threaded hole 59 in body 26 to secure flaps 38 to tool 24. As will be appreciated, mounting flap 38 on flat 36 as illustrated protects screws 58 and the portion of flap 38 through which cap screws 58 extend from abrasion as tool 24 is rotated and advanced in pipe 20. Additionally, as illustrated, each flap 38 is mounted such that the forward end 44 of each flap 38 abuts a forward endwall 42 of flat 36 to help prevent the forward ends 44 of flaps 38 from catching on obstructions in a pipeline as tool 24 is advanced into the pipe, thereby minimizing the possibility that a flap will be torn off of tool 24 in operation.

Body 26 includes an axially extending fluid passage 60 and threaded apertures 62 that communicate with drill string 22 secured in recess 32 to allow a pressurized fluid such as water to pass through body 26 and apertures 62 to one or more nozzles 64. In the illustrated embodiment, tool 24 is provided with three nozzles in groove 28, each positioned midway between adjacent flaps 38 at equal intervals (60°, 180° and 240°) around the circumference of groove 28. Nozzles 64 are positioned in recesses 65 in groove 28 to protect the nozzles from abrasion and from hanging up on obstructions during the cleaning operation.

Nozzles 64 are each directed at different angular orientations to eject the pressurized fluid evenly around the circumference of the tool and are angled rearwardly (e.g., 5 to 45°) to create a flow in a rearward direction to wash out the pipe interior as the drill string advances from through pipe 20 from an entry zone (manhole 14) to an exit zone (second manhole 16). In one embodiment wherein a Vermeer Navigator® horizontal drilling machine is employed, approximately 50 gpm of water at 150 psig. is supplied through the drill string to nozzles 64 to suspend and flush grease and solids from pipe 20 as tool 24 is advanced. Solids and grease scraped from the interior of pipe 20 are thus slurried with water or a mixture of water and a surfactant and flow back past tool 24 to manhole 14 where the mixture may be vacuumed or pumped out of the manhole if the volume of slurry warrants.

Tool 24 provides several advantages over conventional high pressure water blasting techniques for cleaning underground horizontal pipes. Tool 24 utilizes equipment, in particular the horizontal drilling machine, that is necessarily on site, eliminating the need for special high pressure water blasting equipment. Further, tool 24 is driven with a rigid drill string, the tool can be forced through accumulations of grease and solids in a pipe that a conventional water blasting apparatus may not be able to penetrate. The use of flaps 38 further provides a scraping action against the interior of a pipe being cleaned that tends to dislodge accumulated materials faster than a conventional water blasting apparatus that relies on one or more narrow streams of high pressure water to cut accumulated material from the inside of the pipe. In applications were the material to be removed is sufficiently soft, water soluble and/or of sufficiently small volume, flaps 38 may be omitted. In other applications the horizontal drilling machine may be equipped with a pump capable of delivering a water pressure sufficient to cut though the build up in which case the flaps may also be unnecessary. The flushing operation may be carried out at the same time as rotary cleaning, or thereafter.

In many cases, after the cleaning operation is completed, it is advantageous to visually inspect the interior of the pipe. One important reason for visual inspection of the pipe is to accurately determine the locations where lateral pipe runs are connected to the main pipeline. In the case of a sanitary sewer, these joints typically comprise a connection to a house or other building that must be replaced after the new pipe has been installed. Replacing such lateral connections generally requires excavating and replacing the joint to reconnect the lateral pipe run. Determining the location of the joint through a visual inspection of the interior of the pipe facilitates this process and reduces the amount of excavation required.

Conventional techniques for inspecting the interior of a horizontal underground pipe in this manner utilize a camera mounted on a powered robot or tractor equipped with a powered ground drive such as wheels or tracks or pulled with a cable. A cable is attached to the robot or tractor to transmit signals from the camera to a recording device such as a video recorder and the location of lateral connections is determined by the footage of cable extended into the pipe or through the use of a radio frequency transmitter carried by the robot. In the case where a transmitter is used, the location of the crossover is determined by locating the robot with a receiver carried on the surface when the camera transmits an image corresponding to the location of a lateral connection.

The use of a robot or tractor to carry a camera through an underground pipe for inspection purposes has disadvantages. The robot or tractor is an expensive piece of additional equipment that must be brought on site and maintained. Since a robot or tractor relies on wheels or tracks for mobility, such units are subject to becoming jammed or stuck in the pipeline, requiring excavation or similar measures to retrieve the unit.

Referring to FIGS. 7 and 8, in one aspect of the invention, a camera assembly 70 is mounted on the end of a drill string for inspecting an underground pipe, preferably after the pipe has been cleaned. As best shown in FIG. 8, camera assembly 70 includes a generally cylindrical carrier body 72 with a splined recess or socket 74 extending into the rear of carrier body 72 that is configured to receive the male end 76 of a splined connection or joint such as described in Wentworth U.S. Pat. No. 6,148,935. As shown, carrier body 72 is removably coupled to sonde housing 21 with such a joint by a retainer such as a roll pin that interlocks sonde housing 21 and body 72. Alternatively, carrier body 72 may be connected to drill string 22 with any number of conventional joints known in the art including, for example, a standard API threaded joint. Carrier body 70 is substantially smaller in diameter than the pipe to be inspected and includes one or more forwardly inclined side surfaces 78 extending forwardly from a supporting heel 79 to aid in guiding carrier assembly 72 smoothly through the pipe to be inspected.

A video camera 80 is mounted in a central, longitudinally extending cavity 82 in carrier body 72 for inspecting the pipeline. As illustrated, camera 80 is installed in cavity 82 through a forwardly facing opening 81 in carrier body 72 and secured with a threaded collar 84. Opening 81 provides camera 80 with a forward field of view through which camera 80 may image the walls of a pipe as it advances through the pipe. A cutout 83 is formed in a sidewall 85 of carrier body 72 to further enable camera 80 to image the wall of a pipe as the camera passes through the pipe if camera 80 is equipped for side view imaging. One such camera suitable for use in the practice of the invention is the Pearpoint model 455 TwinView Dual Sensor Auto Upright Digital color camera manufactured and sold by Pearpoint, Inc., 72055 Corporate Way, Thousand Palms, Calif. 92276. The Pearpoint Model 455 includes LED light heads and clock/counter clockwise side-view rotation capability. In the illustrated embodiment, camera 80 can provide an image from both the front and side vantage points. It may be advantageous to reposition the camera to permit other views, such as a rear view of there the drill string has been.

Signals from video camera 80 are transmitted to the operator through a camera cable 87 which passes from the rear of camera 80 through a protective conduit 86, positioned in an axially extending slot 86 in carrier body 72. As shown, camera cable 87 is coupled to an extension cable 88 with a cable connector 90 which allows the camera assembly to be readily connected and disconnected to cable 88 when the camera is installed and removed from the drill string. In order to protect the connector from decoupling during operations, one or more tethers 92 are connected to cable 88 with a tubular holder 94 and secured to camera carrier body 72.

In operation, after pipe section 12 has been cleaned with tool 24, the tool is removed and camera assembly 70 is mounted on the end of drill string 22. Preferably, camera assembly 70 is mounted on drill string 22 so that the camera will be pulled though the bore as the drill string is retracted through pipe section 12. Cable 88 is connected to camera cable 87 and camera assembly 70 is pulled though the bore as drill string 22 is retracted from manhole 16 to manhole 14, allowing camera 80 to acquire and transmit images of the pipe interior to the operator on the surface, who view the camera images on a video display. This allows the operator to determine the location of lateral connections and pipe joints either by measuring the footage of cord extended. Cable 88, which extends out in front of the camera 70, may be marked with length gradations 91 for this purpose, in the manner of a tape measure. In the alternative, camera assembly 70 is mounted on sonde housing 21 with sonde 100 generating a signal detectible with a walkover receiver on the surface above the pipe section. Using the walkover receiver, in conjunction with the images supplied by camera 80, an operator can quickly and easily locate lateral connections and pipe joints and mark them on the surface such as with a flag or spray paint. Similarly, depending on the conditions, it may be possible to transmit the image data with the camera forming part of a wireless network rather than use a cable to transmit the images to the surface. After the inspection is completed, the camera assembly is uncoupled from drill string 22 and disconnected from cable 88 after which cable 88 is retrieved from pipe section 12, completing the inspection operation.

After the cleaning and/or inspection processes are completed, pipe 12 may be replaced using a number of conventional bits, reamers, pipe bursting devices and pipe pullers, by bursting or slitting the existing pipe and then pulling in the replacement pipe. The bore may be completed either at a pipe exit pit or existing exit structure beneath the ground surface such as a manhole. Lateral connections are then made by excavating at the locations found earlier and joining the laterals (branch lines) to the new pipe. If desired, in accordance with the method of the invention, the operator then reenters the new pipe with the drill string and de-beads the fuse joints of the new product pipe using a drill stem mounted on a debeading device as known within the industry. Such a device acts as a reamer to shear the beads from the inside of the pipe using a circumferential motion. If desired, the operator may then perform a final camera inspection of the installed pipe using camera assembly 70.

While certain embodiments of the invention have been illustrated for the purposes of this disclosure, numerous changes in the method and apparatus of the invention presented herein may be made by those skilled in the art, such changes being embodied within the scope and spirit of the present invention as defined in the appended claims. The camera, for example, need not be provided with the specialized housing described, and could be pulled through the pipe connected to the end of the drill string by a tether. The terminal or distal end of the drill string, as used in the claims, means the end of the foremost of a series of identical hollow drill rods, or a starter rod, sonde housing or other component that may be interposed between the attachment of the invention and leading rod of the drill string.

What is claimed is:

1. A method of replacing an existing underground pipe using a boring machine that advances a drill string of hollow rods through the pipe, comprising the steps of:
   (a) mounting a rotary cleaning tool on a distal end of the drill string;
   (b) using the boring machine to advance the drill string and cleaning tool through the underground pipe, the boring machine rotating the drill string and cleaning tool such that the cleaning tool rotates against the inside surface of the pipe in order to clean the inside of the pipe;
   (c) flushing debris loosened by the cleaning tool from the pipe using a pressure fluid;
   (d) removing the cleaning tool from the drill string and mounting a camera assembly on the distal end of the drill string;
   (e) moving the camera and drill string through the underground pipe with the boring machine and inspecting the inside surface of the pipe with the camera;
   (f) removing the camera from the drill string and replacing it with a pipe destroying apparatus;
   (g) moving the pipe destroying apparatus through the pipe to destroy the existing pipe; and
   (h) installing a replacement pipe along the same line as the destroyed existing pipe.

2. The method of claim 1, wherein step (c) comprises supplying the pressure fluid through the drill string and ejecting the fluid from the cleaning tool during step (b).

3. The method of claim 2, wherein the cleaning tool has a lateral flap attached thereto configured to scrape the inside of the existing pipe as the cleaning tool is rotated by the drill string, and the pressure fluid is ejected through a plurality of nozzles mounted in radially spaced positions on the side of the cleaning tool behind the flap.

4. The method of claim 1, wherein the existing pipe is a sanitary sewer line having a number of lateral line connections, step (e) further comprises determining the locations of the lateral line connections to the existing pipe.

5. The method of claim 4, further providing a sonde proximate the camera, and locating positions of the lateral connections identified with the camera by detecting the position of the sonde from above ground when the camera shows a lateral connection.

6. The method of claim 1, wherein steps (a) to (c) are performed as the drill string is extended from an entrance to an exit at opposite ends of the existing pipe, step (d) is performed while a distal end of the drill string is near the exit, and step (e) is performed as the drill string is retracted from the exit back to the entrance.

7. The method of claim 6, wherein an extension cable extends in front of the camera as the drill string is retracted through the existing pipe, which extension cable includes measuring gradations viewable with the camera.

8. The method of claim 1, wherein the camera is configured to create an image of a front view ahead of the camera and a side view to one side of the camera.

9. A method of replacing an existing underground pipe using a boring machine that advances a drill string of hollow rods through the pipe, comprising the steps of:
   (a) cleaning the underground pipe with a cleaning tool having a nose with a plurality of tangentially extending flexible flaps, the drill string and cleaning tool being rotated by the boring machine as the tool is advanced through the pipeline such that the flaps contact the inside of the pipe during the cleaning operation;
   (c) flushing debris loosened by the cleaning tool from the pipe using a pressure fluid;
   (d) replacing the cleaning tool with a camera assembly on the distal end of the drill string and inspecting the inside of the pipe utilizing the camera assembly;
   (f) replacing the camera assembly with a pipe destroying apparatus and advancing the pipe destroying apparatus through the pipe; and
   (g) installing a replacement pipe.

10. The method of claim 9 further comprising ejecting a pressure fluid through at least one nozzle adjacent at least one flap as the cleaning tool is rotated and advanced through the pipeline.

11. The method of claim 9 further comprising ejecting a pressure fluid through a plurality of recessed nozzles, the nozzles being located behind the flaps and in spaced apart intervals around the circumference of the nose section.

12. The method of claim 9 further comprising ejecting a pressure fluid through a plurality of recessed nozzles in a rearward direction, the nozzles being angled rearwardly and located behind the flaps in spaced apart intervals around the circumference of the nose section.

13. The method of claim 9 wherein an outer portion of a front edge of each flap angles rearwardly, the cleaning tool being rotated as the tool is advanced through the pipeline such that the flaps gradually contact the inside of the pipe during the cleaning operation.

14. The method of claim 9 further comprising monitoring the position of the camera assembly as it is advanced through the pipe with a sonde mounted proximate the camera.

15. The method of claim 9 further comprising locating positions of pipe joints identified with the camera by detecting the position of a sonde mounted adjacent the camera from above ground when the camera shows a pipe joint.

16. The method of claim 9 further comprising monitoring the position of the camera assembly as it is advanced through the pipe with a cable attached to the camera.

17. The method of claim 9 further comprising locating positions of pipe joints identified with the camera by determining the position of the camera with a cable attached to the camera when the camera shows a pipe joint.

18. The method of claim 9 further comprising locating positions of lateral connections identified with the camera by determining the position of the camera with a cable attached to the camera when the camera shows a lateral connection.

19. A method of replacing an existing underground pipe using a boring machine that advances a drill string of hollow rods through the pipe, comprising the steps of:

(a) mounting a camera assembly on the distal end of the drill string;

(b) moving the camera and drill string through the underground pipe with the boring machine and inspecting the inside surface of the pipe with the camera;

(c) locating positions of lateral connections identified with the camera by detecting the position of a sonde mounted adjacent the camera when the camera shows a lateral connection;

(d) removing the camera from the drill string and replacing it with a pipe destroying apparatus;

(e) moving the pipe destroying apparatus through the pipe to destroy the existing pipe;

(f) installing a replacement pipe along the same line as the destroyed existing pipe; and (g) then connecting the replacement pipe to lateral pipelines at the lateral connections.

\* \* \* \* \*